United States Patent [19]

Motsinger et al.

[11] 4,027,071

[45] May 31, 1977

[54] FORMING SIZE FOR GLASS FIBERS

[75] Inventors: Donald L. Motsinger, Forest City; Charles E. Nalley, Shelby; Joe B. Lovelace, Forest City, all of N.C.

[73] Assignee: PPG Industries, Inc., Pittsburgh, Pa.

[22] Filed: Aug. 18, 1975

[21] Appl. No.: 605,577

Related U.S. Application Data

[60] Division of Ser. No. 491,730, July 23, 1974, Pat. No. 3,933,711, which is a continuation-in-part of Ser. No. 302,611, Oct. 31, 1972, abandoned.

[52] U.S. Cl. .............................................. 428/392
[51] Int. Cl.$^2$ ...................................... C03C 17/32
[58] Field of Search .......................... 428/392, 426

[56] References Cited

UNITED STATES PATENTS

| | | | |
|---|---|---|---|
| 3,261,736 | 7/1966 | Eilerman | 260/29.6 MM |
| 3,454,515 | 7/1969 | Hathwar | 260/29.6 ME |
| 3,655,353 | 4/1972 | Nalley et al. | 65/3 |
| 3,817,898 | 6/1974 | Ward | 260/29.6 NR |
| 3,850,869 | 11/1974 | Mohr | 260/29.6 MN |

*Primary Examiner*—Lucille M. Phynes
*Attorney, Agent, or Firm*—Alan T. McDonald; John E. Curley

[57] ABSTRACT

A glass fiber forming size utilized to produce glass fiber strands is described in which the forming size is an aqueous mixture of polyvinyl acetate, fatty acid lubricant, methacrylato chromic chloride and gamma (ethylene diamine) propyl trimethoxy silane, the mixture being adjusted to pH between 6.1 and 6.5. The size composition is applied to glass fibers during forming. The strands produced utilizing this forming size find particular utility when formed into roving and produce a particularly effective gun roving product.

4 Claims, No Drawings

FORMING SIZE FOR GLASS FIBERS

CROSS-REFERENCE TO RELATED APPLICATIONS

This application is a division of application Ser. No. 491,730, filed July 23, 1974, now U.S. Pat. No. 3,933,711, which is a continuation-in-part of application Ser. No. 302,611, filed Oct. 31, 1972, now abandoned.

BACKGROUND OF THE INVENTION

Fiber glass has been utilized for many years in the preparation of polyester resin fiber glass reinforced articles. One of the more important systems utilized in preparing fiber glass reinforced articles is the spray-up process. In this process a spray gun and a fiber glass roving chopper are combined so that the polyester resin to be utilized and roving are sprayed simultaneously onto a mold from a spray gun which has built into it a chopper. Fiber glass utilized for these purposes is provided in the form of roving and should possess good wet-out characteristics. Thus, the application of a satisfactory forming size on the surface of the glass fiber utilized to prepare the fiber glass roving for this use is important in providing a fiber glass product which is compatible with the polyester resins utilized in the spray-up process industry. Thus the sized roving must be capable of readily mixing with the resins used in the spray gun type applicator and should possess good laydown characteristics when sprayed on a mold in the manner conventionally employed in the spray-up industry.

THE INVENTION

In accordance with the present invention a novel forming size is provided for glass fibers which is readily compatible with polyester resins which finds particular utility when formed into fiber glass roving for utilization in the spray-up process fiber glass reinforcement field. Thus, in accordance with the instant invention a fiber glass sizing composition is provided which comprises an aqueous mixture of a polyvinyl acetate film former, a fatty acid lubricant, methacrylato chromic chloride, and gamma (ethylene diamine) propyl trimethoxy silane. The sizing mixture described above is provided with sufficient quantities of ingredients to provide a formulation which results in an aqueous mixture containing between 7 and 7.5 percent by weight solids. It is an important consideration in preparing the forming size of the instant invention that the pH of the aqueous mixture be adjusted to between 6.1 and 6.5, preferably that it be controlled between 6.2 and 6.4.

In formulating the novel sizing composition of the instant invention various textile lubricants are employed and are preferably cationic or non-ionic in character. Thus, commercially available solubilized fatty acid amides including both saturated and unsaturated fatty acid amides where the acid group contains from 4 to 24 carbon atoms are typically employed. Also utilized are anhydrous acid solubilized polymers of lower molecular weight unsaturated fatty acid amides. A particularly effective material for utilization as a textile lubricant in the applicant's novel system is the pelargonic acid amide of tetraethylene pentamine. On a weight solids basis the sizing composition, this lubricant is used in amounts between 4 and 7 percent.

A major ingredient of the size formulation of the instant invention is polyvinyl acetate film former (40 to 60 percent weight solids) and in the typical size formulations employed in the instant invention the polyvinyl acetate content of the aqueous size solution ranges between 70 to 90 percent by weight basis the total weight of the size solution solids.

A coupling agent is employed in the preparation of the instant size and typical of the coupling agents employed are complex compounds of the Werner type in which a trivalent nuclear atom such as chromium is coordinated with organic acid such as methacrylic acid, i.e., a methacrylic acid complex of chromic chloride. Such agents are described in U.S. Pat. No. 2,611,718. Other Werner type coupling agents having vinyl alkyl, amino, epoxy, mercaptyl, thioalkyl, thioaryl and phenyl groups are also suitable for incorporation of the size of the instant invention. On the basis of the size ingredients other than water, this material is used in amounts of 2 to 6 percent by weight solids.

The size composition of the instant invention also contains gamma (ethylene diamine) propyl trialkoxy silanes. While it is contemplated that various alkoxy groups may be linked to the silica atom, the preferred material of this character utilized in the practice of the invention is gamma (ethylene diamine) propyl trimethoxy silane. Silanes of this particular type have been found to be particularly effective in producing the size composition of the instant invention and in particular in producing fiber glass strands which when made into roving provide a superior gun roving product for spray-up applications in the fiber glass resin reinforcement area. On the basis of the size ingredients other than water this material is used in amounts of 3 to 6 percent by weight, preferably 4 to 5 percent by weight.

In applying the formulations of the instant invention to glass fibers the glass fiber strand is formed by a multitude of fine fiber glass filaments which are drawn at a high rate of speed through molten cones of glass located at the tips of small orifices in a bushing such as shown in U.S. Pat. No. 2,133,238. During formation the filaments are coated while they are moving at speeds on the order of 5,000 to 20,000 feet per minute with the forming size of the instant invention. The size may be sprayed on the fibers as they are being drawn or in the preferred embodiment the fibers may be drawn across the surface of a roller applicator on which the size is placed. The fibers after sizing are grouped into strands which are then wound typically onto forming packages utilizing a winder and an associated paper or plastic or other type forming tube located on the surface of the winder in the conventional manner. The forming packages containing the fiber glass strand sized with the sizing composition of the instant invention may then be formed into roving by unwinding a plurality of strands from several forming packages positioned on a creel and combining the strands in parallel form and winding the strands on tubular support in the conventional manner.

The size of the instant invention is prepared by mixing the polyvinyl acetate latex with water in a mixing tank with stirring. To the polyvinyl acetate — water mixture is added to gamma (ethylene diamine) propyl trialkoxy silane which has preferably been premixed with cold water. After mixing these ingredients the coupling agent is added slowly to the mix tank. After mixing the coupling agent into the mixing tank the fiber glass lubricants are then added. The mixture is then diluted to final volume with water. The mixture is checked for its pH characteristics and sufficient acetic acid is added to control the pH between 6.1 and 6.5.

The size of the instant invention is applied to the individual glass fibers as has been stated during their formation. Thus, the size is applied to the individual fibers just after they emerge from the orifices in an electrically heated platinum alloy bushing containing the molten glass. Further, the size is applied to the filaments prior to the time they are grouped together to form a strand and application of size is preferably by means of a roller applicator which is partially submerged in the size solution which is contained in the reservoir. Such an applicator is shown in more detail in U.S. Pat. No. 2,728,972. The fibers after size is applied are then grouped into strands by using a graphite guide and wound around a rotating forming tube which produces strand travel of approximately 5,000 to 20,000 feet per minute. Other methods of applying the size to the strand of glass fibers such as pad applicators may be employed and the strand may be formed by means other than winding on the forming tube such as by means of a pair of rotating wheel pullers which direct strand into a suitable collecting device. After the fiber glass strands have been wound on the forming tube, they are then dried at approximately 240° F. for a period of about 11 hours. After drying, the strands are then processed in a conventional manner by placing the forming tubes on a balloon creel and combining the strands in parallel form and winding them on a tubular support to provide roving packages.

Upon drying subsequent to the application of the aqueous sizing mixture, glass fibers are provided which contain on the surface thereof a coating residue obtained by evaporation of the moisture on the surface of the glass fibers of the aqueous mixture of polyvinyl acetate, fatty acid lubricant, methacrylato chromic chloride and the gamma (ethylene diamine) propyl trialkoxy silane.

The following example illustrates a typical preparation of the forming size of the instant invention.

Example I

| | | Parts by Weight (grams) |
|---|---|---|
| Polyvinyl acetate (film former 56 percent solids in water) | | 4500 |
| 1. | Volan (Werner complex of methacrylic acid-chromic chloride 19 percent solids in isopropanol) | 334 |
| 2. | Gamma (ethylene diamine) propyl trimethoxy silane in methanol (40 percent volume by wt.) Z-6026 | 226 |
| 3. | Cationic fatty acid amide (Emery 4046D) | 24 |
| 4. | Pelargonic acid amide of tetraethylene pentamine (C-185A) | 112 |
| Water (sufficient to provide 10 gallons of size mix) | | |
| Acetic acid - amount necessary to control pH at 6.3 ± 0.2 | | |

1. "Volan" methacrylic acid complex of chromic chloride sold by E. I. Du Pont.
2. Z-6026 - methanolic solution of gamma (ethylene diamine) trimethoxy silane sold by Dow Corning.
3. Emery 4046D - cationic fatty acid amide sold by Emery Industries.
4. C-185A - pelargonic acid amide of tetraethylene pentamine sold by Imperial Chemical Industries.

The size preparation listed above is prepared by mixing the polyvinyl acetate with about 35 percent of the total water to be used in preparing the final size solution volume. The gamma (ethylene diamine) propyl trimethoxy silane is then mixed with a small quantity of cold water and added to the mixing tank followed by the addition of the anti-static agent. The cationic fatty acid amide and the pelargonic acid amide of tetraethylene pentamine are mixed in hot water and added to the size ingredients with continuous mixing. The mixing tank is then diluted to the final volume of 10 gallons. The pH is then measured and acetic acid is added in sufficient quantity to control the pH at 6.3 ± 0.2. It is preferred that the pH of the final size be maintained at 6.3.

After mixing the forming size of Example I it is applied to the individual glass fibers during their formation. The size is applied to the individual fibers after they emerge from the orifices in the electrically heated platinum alloy bushing containing the molten glass and the size is applied to the filaments prior to the time they are grouped together to form a strand by means of a roller applicator such as the type shown in U.S. Pat. No. 2,728,972. The fibers are collected on a collet operating at speeds of about 6,000 revolutions per minute and the roller applicator speed is maintained at approximately 145 revolutions per minute. The forming packages are baked for a period of 11 hours at 240° F. and are then placed on an appropriate balloon creel and wound on a roving winder to provide a fiber glass roving product containing the dried residue of the aqueous size composition placed on the fibers during formation. The dried residue on the glass fibers represents a coating of between 1.25 and 1.55 percent by weight basis the bare glass. Roving produced by fibers sized with this quantity of the sizing of the instant invention has been found particularly effective in producing spray-up fiber glass reinforced resin products.

While the invention has been described with reference to certain specific examples and illustrative embodiments, it is not intended to be limited thereby except insofar as appears in the accompanying claims.

We claim:
1. A glass fiber containing on the surface thereof a coating residue obtained by drying on the surface of the glass fibers an aqueous sizing composition whose ingredients other than water consists essentially of: 70 to 90 percent by weight based on total weight of the size solution solids of a polyvinyl acetate film former; 4 to 7 percent by weight based on solids fatty acid amide lubricant; 3 to 6 percent by weight solids gamma-ethylene diamine propyl trialkoxy silane; and 2 to 6 percent by weight solids methacrylic acid chromic halide coupling agent; said sizing composition having been adjusted to a pH of about 6.2 to 6.4; and said composition having 7.0 to 7.5 percent by weight solids.

2. The glass fibers of claim 1 wherein the alkoxy silane is gamma (ethylene diamine) propyl trimethoxy silane.

3. The glass fibers of claim 2 wherein the gamma (ethylene diamine) propyl trimethoxy silane is between 4 to 5 percent by weight of the size ingredients exclusive of the water.

4. The glass fibers of claim 1 wherein the gamma (ethylene diamine) propyl trialkoxy silane is between 4 to 5 percent by weight of the size ingredients exclusive of the water.

* * * * *